United States Patent
Jeong (10) Patent No.: US 8,725,955 B2
(45) Date of Patent: May 13, 2014

(54) CHIP COMBINED WITH PROCESSOR CORES AND DATA PROCESSING METHOD THEREOF

(75) Inventor: Jong-Sik Jeong, Seoul (KR)

(73) Assignee: Mtekvision Co., Ltd., Seoul (KR)

( * ) Notice: Subject to any disclaimer, the term of this patent is extended or adjusted under 35 U.S.C. 154(b) by 721 days.

(21) Appl. No.: 12/524,514

(22) PCT Filed: Jan. 24, 2008

(86) PCT No.: PCT/KR2008/000438
§ 371 (c)(1),
(2), (4) Date: Jul. 24, 2009

(87) PCT Pub. No.: WO2008/091116
PCT Pub. Date: Jul. 31, 2008

(65) Prior Publication Data
US 2010/0115170 A1    May 6, 2010

(30) Foreign Application Priority Data
Jan. 26, 2007    (KR) .................. 10-2007-0008457

(51) Int. Cl.
*G06F 12/00*    (2006.01)
(52) U.S. Cl.
USPC .... 711/147; 711/153; 711/163; 711/E12.023; 711/E12.038; 709/213; 709/215
(58) Field of Classification Search
USPC .......... 711/147, 153, E12.023, E12.038, 163; 709/213, 215
See application file for complete search history.

(56) References Cited

U.S. PATENT DOCUMENTS

| | | | |
|---|---|---|---|
| 6,542,926 B2 * | 4/2003 | Zalewski et al. | 709/213 |
| 6,643,713 B2 | 11/2003 | Nakagawa et al. | |
| 2003/0088744 A1 | 5/2003 | Jain et al. | |
| 2005/0021871 A1 | 1/2005 | Georgiou et al. | |
| 2006/0161745 A1 * | 7/2006 | Lee et al. | 711/154 |
| 2007/0070794 A1 * | 3/2007 | Lee et al. | 365/233 |
| 2007/0124554 A1 * | 5/2007 | Allen et al. | 711/163 |
| 2008/0046638 A1 * | 2/2008 | Maheshwari et al. | 711/103 |
| 2008/0109662 A1 * | 5/2008 | Natarajan et al. | 713/193 |
| 2008/0168568 A1 * | 7/2008 | Brodersen et al. | 726/30 |

FOREIGN PATENT DOCUMENTS

| | | | |
|---|---|---|---|
| KR | 10-2004-0064000 A | | 7/2004 |
| WO | WO 2006/126777 | * | 11/2006 |

* cited by examiner

*Primary Examiner* — Gurtej Bansal
(74) *Attorney, Agent, or Firm* — Birch, Stewart, Kolasch & Birch, LLP (57) ABSTRACT

A chip having integrated multiple processor cores and a data processing method are disclosed. The processor chip includes an MP core (main processor core), an AP core (application processor core) which performs a processing function designated by a control of the MP core, a first SM controller which sets a path such that the MP core is coupled with a shared memory, and a second SM controller which sets a path such that the AP core is coupled with the shared memory. By virtue of the present invention, the number of chips installed can be minimized, to allow efficient utilization of PCB space and enable a compact size for a portable terminal.

24 Claims, 5 Drawing Sheets

CHIP COMBINED WITH PROCESSOR CORES AND DATA PROCESSING METHOD THEREOF

CROSS-REFERENCE TO RELATED APPLICATIONS

This application claims foreign priority benefits under 35 U.S.C. §119(a)-(d) to PCT/KR08/00438, filed Jan. 24, 2008, which is hereby incorporated by reference in its entirety.

BACKGROUND

1. Technical Field

The present invention relates to a digital processing device, more particularly to a chip having integrated multiple processor cores and to a data processing method.

2. Description of the Related Art

Among the types of digital processing devices, the portable terminal is an electronic device that is made to have a small size, to perform functions for gaming, mobile communication, etc., as well as to allow convenient carrying by a user. Different types of a portable terminal may include, for example, a mobile communication terminal, a personal digital assistant (PDA), a portable multimedia player (PMP) and an MP3 player, etc.

Here, the mobile communication terminal is basically a device implemented to enable telecommunication between persons in remote locations. By using a mobile communication terminal, it is possible for a user to telecommunicate with a remotely-located receiver even while in motion. However, thanks to developments in technology, the latest mobile communication terminal is further equipped with supplementary functions such as camera and multimedia data playback, in addition to the basic functions of voice communication, short message service, and address book.

Figure 1:
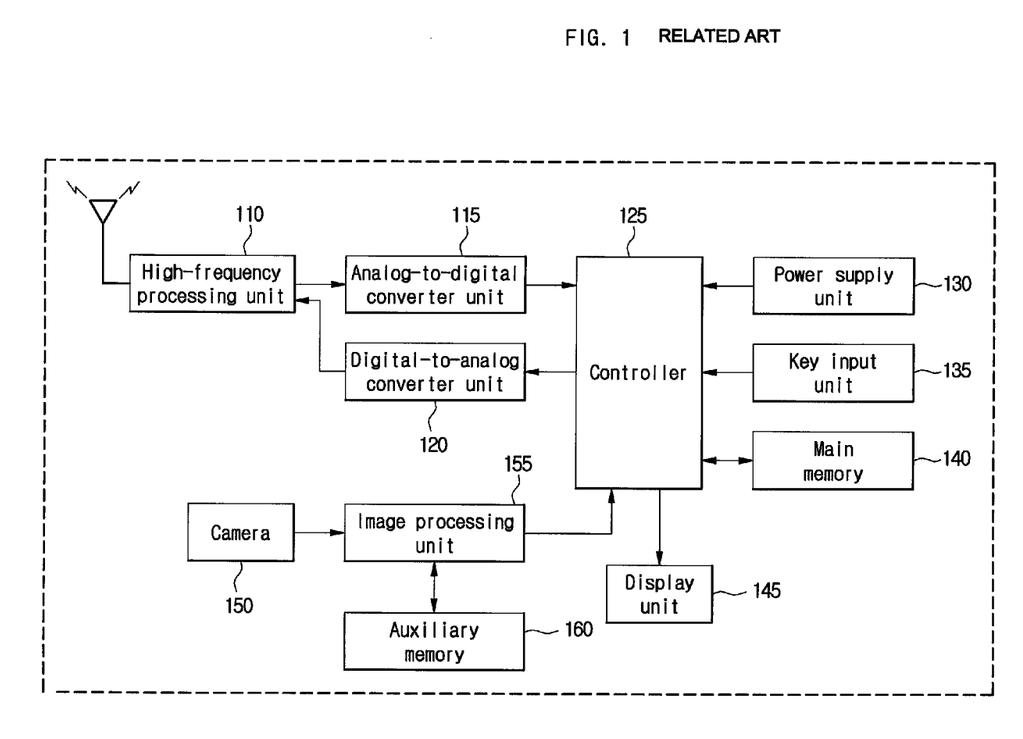
FIG. 1 is a block diagram illustrating the composition of a mobile communication terminal equipped with a camera function according to the related art.

FIG. 1 is a block diagram illustrating the composition of a mobile communication terminal equipped with a camera function according to the related art.

Referring to FIG. 1, a mobile communication terminal 100 equipped with a camera function as a supplementary function includes a high-frequency processing unit 110, an analog-to-digital converter unit 115, a digital-to-analog converter unit 120, a controller 125, a power supply unit 130, a key input unit 135, a main memory 140, a display unit 145, a camera 150, an image processing unit 155, and an auxiliary memory 160.

The high-frequency processing unit 110 processes high-frequency signals received or transmitted through an antenna.

The analog-to-digital converter unit 115 converts analog signals, inputted from the high-frequency processing unit 110, into digital signals and transfers the signals to the controller 125.

The digital-to-analog converter unit 120 converts digital signals, inputted from the controller 125, into analog signals and transfers the signals to the high-frequency processing unit 110.

The controller 125 controls the overall operation of the mobile communication terminal 100. The controller 125 may include, for example, a central processing unit (CPU) or a microcontroller.

The power supply unit 130 supplies electric power necessary for operating the mobile communication terminal 100. The power supply unit 130 can be coupled to an external power source or can include terminals for coupling to a battery, etc.

The key input unit 135 generates key data for setting various functions in the mobile communication terminal 100 or for dialing, etc., and transfers the data to the controller 125. The key input unit 135 can be implemented, for example, as a key pad that includes multiple key buttons.

The main memory 140 stores the operating system of the mobile communication terminal 100 and various data, etc. The main memory 140 can be composed of flash memory, EEPROM (Electrically Erasable Programmable Read Only Memory), etc.

The display unit 145 displays the operational status of the mobile communication terminal 100 and external images photographed using the camera 150, etc. The display unit 145 can include, for example, a liquid crystal display (LCD) panel.

The camera 150 photographs an external image (a photographic subject) and generates and outputs an image signal corresponding to the photographed external image.

The image processing unit 155 processes the image signals inputted from the camera 150. The image processing unit 155 performs such functions as color interpolation, gamma correction, image quality correction, and JPEG encoding, etc. The camera 150 and image processing unit 155 can be controlled by the controller 125.

The auxiliary memory 160 stores the external image processed by the image processing unit 155, etc.

As described above, the mobile communication terminal 100 having a camera function is equipped with multiple processor chips. That is, a main processor chip and one or more application processor chips are included. An application processor chip is controlled by the main processor chip to perform a preset supplementary function.

Referring to the mobile communication terminal 100 illustrated in FIG. 1, the mobile communication terminal 100 includes a controller 125, which is a main processor (MP) for controlling the overall functions, and an image processing unit 155, which is an application processor (AP) for controlling the camera function. As described above, the image processing unit 155 is controlled by the controller 125. The controller 125 and the image processing unit 155 are implemented as independent processors (or processor chips), and each of the processors is coupled to an independent memory.

The types of application processors, which can be implemented as independent processors and which are controlled by the main processor, may vary according to the supplementary functions equipped in the portable terminal. For example, an application processor for performing a camera function can perform such functions as JPEG encoding and JPEG decoding, etc., and an application processor for performing a video playback function can perform such functions as video file (e.g. MPEG4, DIVX, H.264), encoding and decoding, etc., while an application processor for a music file playback function can perform music file (e.g. MP3, WMA, WMV) encoding and decoding, etc.

Each of these processors is coupled individually to a memory, in order to store the processed data. Therefore, according to the related art, the greater the number of functions provided by a portable terminal, the greater must be the number of processors and the number of memories included, which as a result causes an increase in the external size of the portable terminal.

Figure 2:
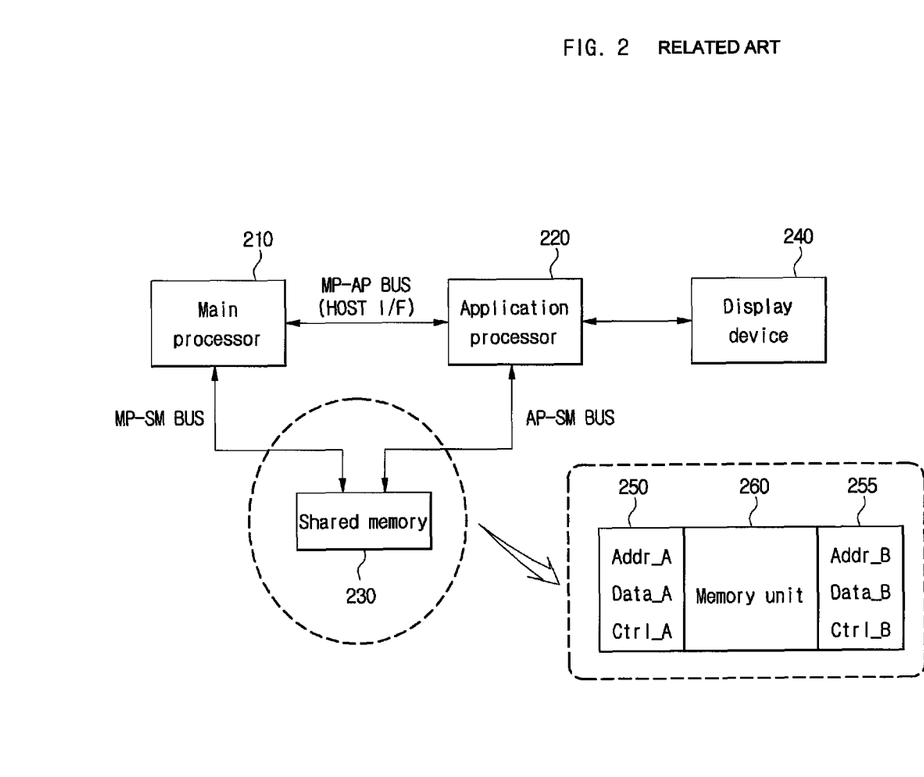
FIG. 2 is a drawing showing a coupling structure for a main processor, an application processor, a shared memory, and a display device, according to the related art.

To resolve this problem, attempts are being made to have a memory shared by multiple processors (or processor chips). FIG. 2 provides an example of a connection relationship in a case where a main processor and an application processor shares a memory.

FIG. 2 is a drawing showing a coupling structure for a main processor, an application processor, a shared memory, and a display device, according to the related art.

Referring to FIG. 2, the main processor 210 and the application processor 220 exchange information through a coupled bus. Here, the exchanged information may be one or more process commands, such as a command for controlling the application processor 220, data to be processed by the application processor 220, an activate/deactivate command for the display device 240, and an instruction to process data written in the shared memory 230, for example.

In general, a bus refers to a shared-use electrical pathway used in a computer, etc., for exchanging information between a processor, a main memory device, and an input/output device. A bus includes lines for information on the address of each device or the location of a memory device, and lines for differentiating the various data transmission operations to be performed. Hereinafter, the bus that couples the main processor with the application processor 220 will be referred to as the MP-AP bus. Also, the bus that couples the main processor 210 to the shared memory will be referred to as the MP-SM bus, while the bus that couples the application processor 220 to the shared memory 230 will be referred to as the AP-SM bus.

The main processor 210 is coupled by way of the MP-SM bus to the shared memory 230, and writes certain data (e.g. display parameters, etc.) in a particular storage area of the shared memory 230 or reads the data written in a certain storage area. Here, the main processor 210 can be a processor, which controls the overall operation of the digital processing device (e.g. portable terminal) and also controls the operation of the application processor 220. The display parameters can be, for example, coordinates representing a drawing broken down into triangles as needed to display the drawing, and information on what color and effect will be rendered to the plane of the relevant triangle.

The application processor 220 is coupled by way of the AP-SM bus to the shared memory 230, and writes certain data in a particular storage area of the shared memory 230 or reads the data written in a certain storage area.

The application processor 220 can be a processor which exclusively performs a supplementary function (e.g. processing one or more of MPEG4 data processing, 3D graphics, camera functionality, MP3 file playback, etc.) according to the control of the main processor 210.

If such is the case, when a process command (e.g. a process command and process type instruction for data written in a certain address) is received through the MP-AP bus from the main processor 210, the application processor 220 accesses the shared memory 230 through the AP-SM bus, and reads the data written in the relevant storage area of the shared memory 230 (i.e. data written by the main processor 210). Here, as the main processor 210 would store the relevant data in the shared memory 230, the main processor 210 must first terminate the access to the relevant area, in order for the application processor 220 to access the relevant area.

The shared memory 230 is structured to be shared by multiple coupled processors (i.e. the main processor 210 and one or more application processors), and is equipped with access ports, the number of which equals or exceeds the number of processors to be accessed by.

Supposing that the processors sharing the shared memory 230 are one main processor 210 and one application processor 220, as illustrated in FIG. 2, the shared memory 230 must have at least two access ports 250, 255. That is, the main processor 210 may access the memory unit 260 through the MP-SM bus and a first access port 250, while the application processor 220 may access the memory unit 260 through the AP-SM bus and a second access port 255.

Each access port can be equipped with an n number of pins for exchanging address signals with corresponding processors, an m number of pins for exchanging data, and a k number of pins for exchanging control signals. Here, n, m, and k may be certain natural numbers.

Figure 3:
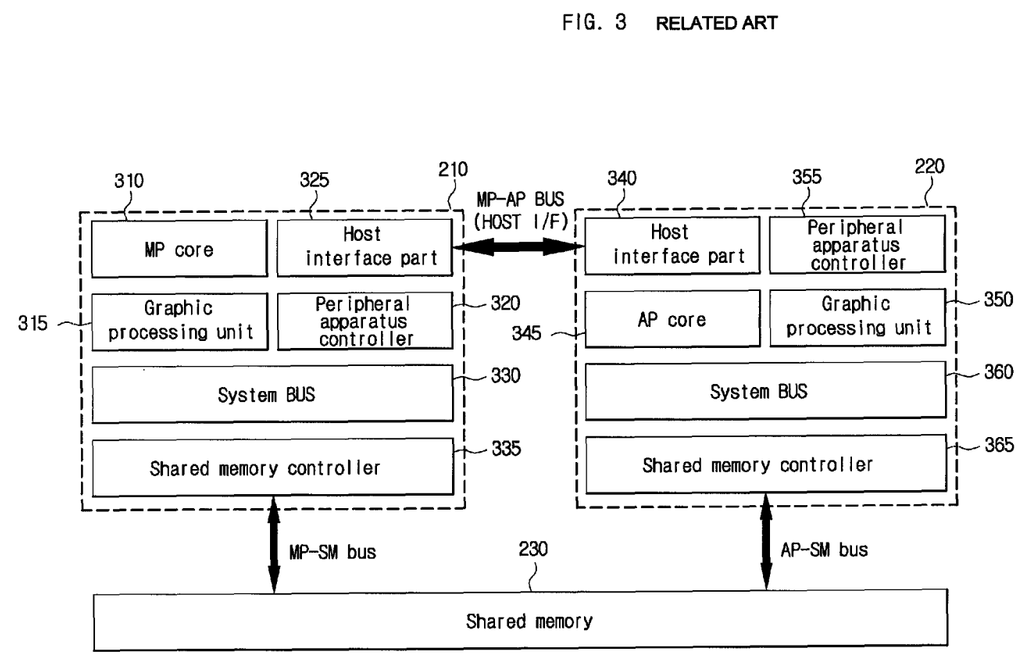
FIG. 3 is a drawing illustrating the detailed compositions of the main processor and application processor in FIG. 2.

FIG. 3 is a drawing illustrating the detailed compositions of the main processor and application processor in FIG. 2.

The conventional structure in which one shared memory 230 is shared by multiple processors 210, 220 includes two independent processor chips and one memory element electrically coupled together. As each processor is implemented as an independent chip, a processor and a processor chip will be used to convey the same meaning in the present disclosure.

The shared memory 230 can be connected to the internal components of each processor by way of the bus (i.e. MP-SM bus, AP-SM bus), as well as a shared memory controller 335, 365 and a system bus 330, 360 included in each processor 210, 220.

As illustrated, the main processor 210 includes an MP core (main processor core) 310, a graphic processing unit 315, a peripheral apparatus controller 320, a host interface part 325, a system bus 330, and a shared memory controller 335.

The MP core 310 controls the overall functioning of the mobile communication terminal 100. That is, it is a component that controls the overall operation of the mobile communication terminal 100, which includes various components such as the main processor 210, application processor 220, shared memory 230, etc. Thus, the MP core 310, by way of the host interface, controls the operations of other coupled application processors, and also provides control for operations based on user commands inputted using the key input unit 135.

The graphic processing unit 315 is a component which processes image data that will be displayed through the display device 240. The graphic processing unit 315 performs the process operations that have to be performed by the main processor 210, from among the various operations for processing image data that will be displayed through the display device 240. The process operations and objectives of the main processor 210 for processing the relevant image data are apparent to those skilled in the art, and thus will not be described here in further detail.

The peripheral apparatus controller 320 provides control for peripheral apparatus that require control by the main processor 210.

The process operations of the graphic processing unit 315 and peripheral apparatus controller 320 described above can be controlled by the MP core 310. Also, it is apparent that the graphic processing unit 315 and the peripheral apparatus controller 320 can be included as components of the MP core 310.

The host interface part 325 is an interfacing means for coupling the main processor 210 with the application processor 220. Based on the operation of the host interface part 325 of the main processor 210 and the operation of the host interface part 340 of the application processor 220, a host interface is set between the two. The host interface is the portion where the signals of two processors interface, and is a path for exchanging information between the main processor 210 and the application processor 220.

The system bus 330 is a means for interfacing that allows each component within the main processor 210 to communicate with one another.

The shared memory controller 335 provides control that allows particular components of the main processor 210 to access the shared memory 230 and write/read data.

The application processor 220 includes a host interface part 340, an AP core (application processor core) 345, a graphic processing unit 350, a peripheral apparatus controller 355, a system bus 360, and a shared memory controller 335.

The host interface part 340 is an interfacing means for coupling the main processor 210 with the application processor 220.

The AP core 345 performs a corresponding operation according to the control command of the MP core 310. The application processor 220 is implemented to perform a particular operation (e.g. camera function, multimedia function, etc.). The AP core 345 controls a corresponding process or controls each of the components within the application processor 220, to make it possible for the application processor 220 to perform a designated operation according to a control command from the MP core 310.

The graphic processing unit 350 is a component which processes image data that will be displayed through the display device 240. The graphic processing unit 350 performs the process operations that have to be performed by the application processor 220, from among the various operations for processing image data that will be displayed through the display device 240. For example, a process may be performed for rendering a particular effect to the relevant image, etc. The process operations and objectives of the application processor 220 for processing the relevant image data are apparent to those skilled in the art, and thus will not be described here in further detail.

The peripheral apparatus controller 355 provides control for peripheral apparatus that require control by the application processor 220.

The process operations of the graphic processing unit 350 and peripheral apparatus controller 355 described above can be controlled by the AP core 345. Also, it is apparent that the graphic processing unit 350 and the peripheral apparatus controller 355 can be included as components of the AP core 345.

The system bus 360 is a means for interfacing that allows each component within the application processor 220 to communicate with one another.

The shared memory controller 335 provides control that allows particular components of the application processor 220 to access the shared memory 230 and write/read data.

As described above with reference to FIG. 2, the main processor 210 has at least two buses for connecting to the application processor 220 and the shared memory 230, respectively, and by having the application processor 220 connect to the display device 240, the main processor 210 may control the display device 240. In other words, the main processor 210 can control which image data is to be displayed through the display device 240.

Also, in transferring data between the main processor 210 and the application processor 220, a method may be used, in which the relevant data is not transferred through the host interface but is written in the shared memory 230 for transfer, to enable a faster mode of data transfer. That is, the main processor 210 may store the data awaiting transfer in a particular location within the shared memory 230, and then transfer information on the location where the relevant is written, through the host interface to the application processor 220, at which the application processor 220 may access the relevant location and read the written data.

As described above, the conventional coupling structure illustrated in FIGS. 2 and 3 has the advantage that the role of the host interface is minimized, as the transfer path of data is set to include the shared memory 230. In other words, the host interface can be limited to serve as a transfer path for information or control commands.

Despite the advantage described above, the conventional coupling structure includes the two independent processor chips and the shared memory 230 existing independently, so that installation space for three chips is necessarily required on the PCB. This becomes a reason why the outer size of a portable terminal cannot be reduced below a certain level.

Also, from the perspective of installing, maintaining, and managing software, there is the inconvenience of having to port programs separately to each of the independent processor chips, and the problem that the software structure becomes complicated.

Furthermore, as described with reference to FIG. 3, two buses must exist independently for accessing the shared memory, while a component 335, 365 for shared memory control must exist individually in each processor chip, to present the problem of complicated communication between processors.

Moreover, in the conventional coupling structure, the internal structure of the shared memory 230 is not defined, and thus the shared memory 230 may be used inefficiently, according to which area each processor is authorized to access.

SUMMARY

As such, in order to resolve the problems described above, the present invention aims to provide a chip having multiple integrated processor cores and a data processing method, in which the number of chips installed is minimized, to efficiently utilize PCB space and enable a compact size for a portable terminal.

The present invention aims to provide a chip having multiple integrated processor cores and a data processing method, which can resolve, in terms of installing, maintaining, and managing software, the inconvenience of having to port programs separately to each of the independent processor chips, and the problem that the software structure becomes complicated.

The present invention aims to provide a chip having multiple integrated processor cores and a data processing method, in which communication and control between processor cores can be simplified.

The present invention aims to provide a chip having multiple integrated processor cores and a data processing method, in which the control flow can be streamlined for the multiple processor cores sharing the shared memory.

The present invention aims to provide a chip having multiple integrated processor cores and a data processing method, in which the storage area of the shared memory can be partitioned into multiple partition areas (e.g. exclusive areas and common areas), to enhance the efficiency of memory use.

The present invention aims to provide a chip having multiple integrated processor cores and a data processing method, in which the common area, from among the partitioned storage areas, can be set to allow the access of each processor, to minimize data transmission times between each of the processor cores.

The present invention aims to provide a chip having multiple integrated processor cores and a data processing method, in which it is possible to transfer data using the common area of the shared memory, whereby supplementary processes for data transfer can be omitted in each processor core, so that the operating speed and efficiency of each processor core can be optimized.

Other objects of the present invention will readily be understood from the description set forth below.

To achieve the above objectives, an aspect of the present invention provides a processor chip having multiple processor cores and/or a digital processing device having the processor chip.

A processor chip according to an embodiment of the present invention may include: an MP core (main processor core); an AP core (application processor core), which performs a processing function designated by a control of the MP core; a first SM controller, which sets a path such that the MP core is coupled with a shared memory; and a second SM controller, which sets a path such that the AP core is coupled with the shared memory.

The MP core may be coupled with the shared memory by way of an MP-SM (shared memory) bus, and the AP core may be coupled with the shared memory by way of an AP-SM bus.

The processor chip may further include a command transfer unit, which transfers command information or authorization information from one of the MP core and the AP core to the other.

The processor chip may further include two or more system buses, where each of the MP core and the AP core may be accessed by a corresponding SM controller through a respective system bus.

The MP core may transmit command information or authorization information to the AP core using one of the system buses.

The processor chip may further include a host interface part for accessing one or more application processor chip. Here, the MP core may control an operation of an application processor chip coupled by way of the host interface part.

The command transfer unit may include a storage area in which to store an identification code corresponding to the command information or the authorization information.

A storage area of the shared memory may be partitioned into exclusive storage areas, which can be allotted exclusively to the MP core and the AP core respectively, and a common storage area, which can be shared by the MP core and AP core. Here, the authorization information may be information exchanged between the MP core and AP core for obtaining authorization to access the common storage area.

In order to access the common storage area, the MP core or the AP core may input an access request, which includes one or more of address information and a control signal, to the shared memory.

The control signal may include an address signal for indicating the common area, and a chip select signal for the shared memory device.

The address signal may include a bank address for indicating a certain common area.

The control signal may include an MRS (mode register set) signal and a chip select signal for the shared memory device.

The MP core, in order to have the AP core process data written in a common storage area of the shared memory, may control the command transfer unit such that a command, which includes a process type indication and a written location of the data to be processed, may be inputted to the AP core.

The MP core may provide control such that designation information on a written location of data processed by the AP core may further be included in the command.

The shared memory may have two or more access ports for coupling with the AP core and the MP core respectively.

The processor chip may further include: a graphic processing unit, which may process and output image data to be displayed through a display device; and a peripheral apparatus controller, which may control an operation of peripheral apparatus coupled to the processor chip according to a control of one or more of the MP core and the AP core.

The processor chip may further include the shared memory, to be implemented as one chip.

The MP core, after writing data in the shared memory, may input a command, which includes a process type indication and a written location of the data to be processed, through the system bus to the AP core, in order to have the written data processed by the AP core.

A processor chip according to another embodiment of the present invention may include: a first and a second system bus; an AP core (application processor core), which performs an operation implementing a predetermined data processing function; and an MP core (main processor core), which performs an operation implementing a predetermined processing function and performs a function for controlling an operation of the AP core. Here, the AP core may, according to a control of the MP core, process data written in a shared memory coupled with each of the MP core and the AP core.

The processor chip may further include a command transfer unit that includes a storage area, in which an identification code may be written by one of the MP core and the AP core. The command transfer unit may input one of command information or authorization information corresponding to the identification code written in the storage area, from among command information or authorization information pre-stored for each identification code, to the other of the MP core and the AP core.

The shared memory may be equipped with two or more access ports for coupling with the AP core and the MP core respectively.

The processor chip may further include: a first SM controller, which sets a path such that the MP core may access the shared memory and write/read data; and a second SM controller, which sets a path such that the AP core may access the shared memory and write/read data. The MP core may be coupled with the shared memory by way of the first SM controller, an MP-SM bus, and a first access port, while the AP core may be coupled with the shared memory by way of the second SM controller, an AP-SM bus, and a second access port.

One of the first system bus and the second system bus may be such that is exclusively used for communication between the MP core and the AP core.

A digital processing device according to yet another embodiment of the present invention may include: a processor chip; and a shared memory having two or more access ports. The processor chip may include: an MP core (main processor core); an AP core (application processor core) that performs a processing function designated by a control of the MP core; a first SM controller that sets a path such that the MP core may be coupled with a shared memory by way of an MP-SM (shared memory) bus; and a second SM controller that sets a path such that the AP core may be coupled with the shared memory by way of an AP-SM bus.

To achieve the objectives set forth above, another aspect of the present invention provides a data processing method in a processor chip.

A data processing method according to an embodiment of the present invention for a processor chip may include: writing, by an MP core, of data in a common storage area of a shared memory and then transferring a process command to an AP core; and accessing, by the AP core, of the common storage area and reading the written data and then processing the written data in correspondence to the process command. Here, the processor chip may include the MP core and the AP core, and each of the MP core and the AP core may be coupled with the shared memory by way of an independent bus.

The transferring of the process command may include: writing, by the MP core, of an identification code in a storage area of a command transfer unit for reading and processing the data; and inputting, by the command transfer unit, of a process command corresponding to the written identification code from among pre-designated process commands to the AP core.

DETAILED DESCRIPTION

The objects, features, and advantages set forth above will become more apparent through the following detailed descriptions provided with reference to the accompanying drawings.

As the present invention allows for various changes and numerous embodiments, particular embodiments will be illustrated in drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In the description of the present invention, certain detailed explanations of related art are omitted when it is deemed that they may unnecessarily obscure the essence of the present invention.

While such terms as "first" and "second," etc., may be used to describe various elements, such elements must not be limited to the above terms. The above terms are used only to distinguish one element from another. For example, a first element may be referred to as a second element without departing from the scope of rights of the present invention, and likewise a second element may be referred to as a first element. The term "and/or" encompasses both combinations of the multiple related items disclosed and any one item from among the multiple related items disclosed.

When an element is mentioned to be "connected to" or "accessing" another element, this may mean that it is directly formed on or stacked on the other element, but it is to be understood that another element may exist in-between. On the other hand, when an element is mentioned to be "directly connected to" or "directly accessing" another element, it is to be understood that there are no other elements in-between.

The terms used in the present disclosure are merely used to describe particular embodiments, and are not intended to limit the present invention. An expression used in the singular encompasses the expression of the plural, unless it has a clearly different meaning in the context. In the present application, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Unless otherwise defined, all terms used herein, including technical or scientific terms, have the same meanings as those generally understood by those with ordinary knowledge in the field of art to which the present invention belongs. Such terms as those defined in a generally used dictionary are to be interpreted to have the meanings equal to the contextual meanings in the relevant field of art, and are not to be interpreted to have ideal or excessively formal meanings unless clearly defined in the present application.

Preferred embodiments of the present invention will be described below in more detail with reference to the accompanying drawings, in which those components that are the same or are in correspondence are rendered the same reference numeral regardless of the figure number, and redundant explanations are omitted.

A shared memory in this disclosure may provide information to one or more processors, on whether or not there is a processor currently accessing a common area, to control multiple processors not to attempt an access to the common area. Also, the shared memory may transfer information to the processor currently accessing, on whether or not a processor is currently requesting access to the common area, to provide for a quick disconnection.

Figure 4:
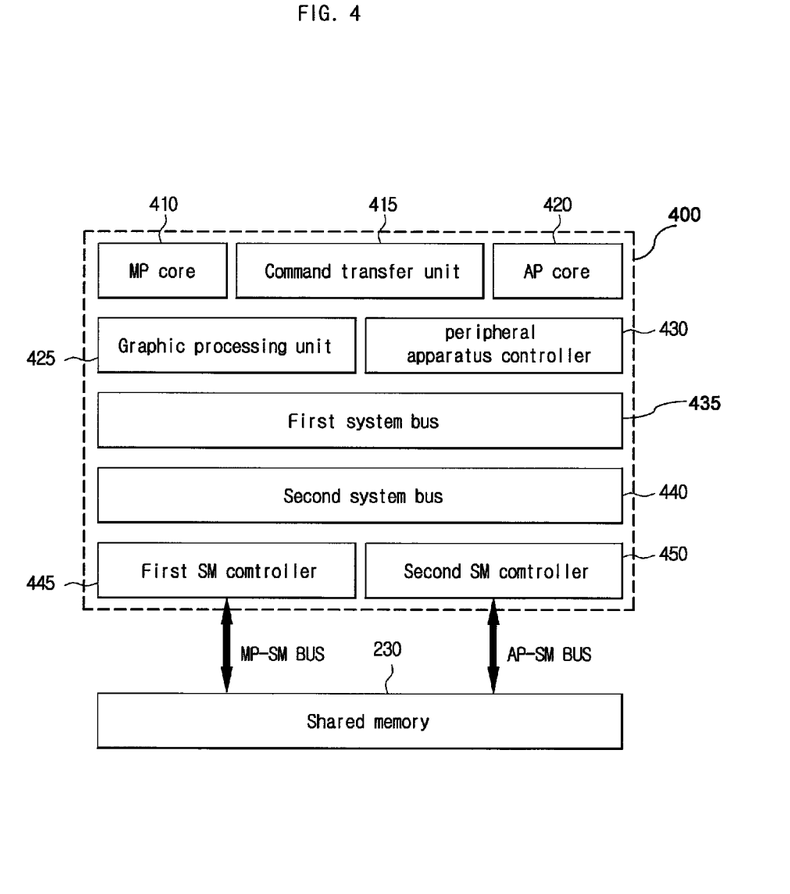
FIG. 4 is a drawing illustrating the detailed composition of an integrated chip according to an embodiment of the present invention.

FIG. 4 is a drawing illustrating the detailed composition of an integrated chip according to an embodiment of the present invention.

Referring to FIG. 4, an integrated chip 400 includes an MP core (main processor core) 410, a command transfer unit 415, an AP core (application processor core) 420, a graphic processing unit 425, a peripheral apparatus controller 430, a first system bus 435, a second system bus 440, a first SM controller (shared memory controller) 445, and a second SM controller 450. Although the integrated chip 400 is illustrated in FIG. 4 as not including a shared memory 230, it is apparent, even with separate explanations omitted, that the shared memory 230 can be included to implement a single chip.

The MP core 410 controls the overall functioning of the portable terminal in which the integrated chip 400 is equipped. That is, it controls the operation of each component within the integrated chip 400 and each component included in the portable terminal (for example, an application processor, memory, display device, etc.), and also provides control for operations based on user commands inputted using a key input unit 135. For example, the MP core 410 may control an operation of the AP core 420 by transferring a control command through the command transfer unit 415 to the AP core 420. While it is not illustrated in FIG. 4, the MP core 410, in order to control an operation of an independently implemented application processor, may further include a host I/F part, in order to couple with the application processor through a host interface.

The command transfer unit 415 performs an interfacing function for transferring command information between the MP core 410 and the AP core 420.

For example, the command transfer unit 415 may perform an interfacing function for specifying the processor authorized for access to the common area 540 (see FIG. 5) of the shared memory 230. When the MP core 410 desires access to the common area 540 of the shared memory 230, it can transfer a corresponding request quickly through the command transfer unit 415 to the AP core 420, and vice versa.

In one example, a storage space may be included within the command transfer unit 415 in which to write the requests by processors desiring authorization to access the common area 540, and when a request is written in the storage space, the command transfer unit 415 may transfer the corresponding request information to the counterpart. The format and content of the request information outputted by the command transfer unit 415 can be pre-designated, and when a request is written in the relevant storage space by the MP core 410 or the AP core 420, the command transfer unit 415 may output the designated request information to the other processor core. The request, etc., may be written in the form of an identification code. In order that the command transfer unit 415 may identify the processor to output the request information to, a separate storage space may be equipped for each processor core, or the request may be written with a pre-designated identifier for a processor core.

In another example, a processor core desiring access to the common area 540 may input command information, for commanding an output of request information, to the command transfer unit 415. The command transfer unit 415 may, on receiving the command information, output the corresponding request to the other processor core. In this case, the command transfer unit 415 can be omitted, and the command information of each processor for accessing the common area 540 (i.e. the command information for obtaining authorization to access the common area 540) can be transferred through a first system bus 435 to the other processor.

If a first processor core (one of the MP core 410 and the AP core 420) that has received the request information from the command transfer unit 415 or received the command information through the first system bus 435 is currently accessing the common area 540, it may rapidly complete the work in the relevant area and then pass the access authorization over to a second processor core (the other of the MP core 410 and the AP core 420). In this case, disconnection information may be transferred through the command transfer unit 415 or the first system bus 435, in order that the second processor core may recognize that the access to the common area 540 has ended. If the disconnection information is transferred through the command transfer unit 415, the first processor core may, for example, delete the information written in the command transfer unit 415, so that this may be recognized by the command transfer unit 415.

Also, the command transfer unit 415 may perform an interfacing function, by which the MP core 410 may input a certain command (e.g. a process command for data written in the shared memory 230, a control command for controlling the AP core 420 to perform a particular operation, etc.) to the AP core 420. When the MP core 410 inputs a pre-designated code value in a storage area of the command transfer unit 415, the command transfer unit 415 may input a command to the AP core 420 that corresponds to the code value. The command that will be outputted in correspondence to the code value written in the storage area can be stored in a pre-designated format. Of course, if the command that the MP core 410 inputs to the AP core 420 is transferred through the first system bus 435, the command transfer unit 415 may be omitted.

Also, the command transfer unit 415 may perform an interfacing function, by which the AP core 420 may input completion information to the MP core 410, when the processing corresponding to the command from the MP core 410 is completed. When the AP core 420 inputs a pre-designated code value in the storage area of the command transfer unit 415, the command transfer unit 415 may input the completion information corresponding to the code value to the MP core 410. The completion information that will be outputted in correspondence to the code value written in the storage area can be stored in a pre-designated format. Of course, if the command that the AP core 420 inputs to the MP core 410 is transferred through the first system bus 435, the command transfer unit 415 may be omitted.

The AP core 420 performs a corresponding operation according to the control command of the MP core 410. The AP core 420 is implemented to perform or control a specified operation (e.g. camera function, multimedia function, etc.). For example, if the AP core 420 is implemented to perform multimedia data decoding, the AP core 420 may, when instructed by the MP core 410 to perform a decoding process for data written in the common area 540, read the relevant data from the common area 540 and perform decoding. Also, when control of the graphic processing unit 425, peripheral apparatus controller 430, etc., is required by the control command of the MP core 410, the AP core 420 may perform the corresponding controlling operations.

The graphic processing unit 425 is a component which processes image data that will be displayed through the display device 240. The graphic processing unit 425 performs the process operations that have to be controlled by the MP core 410 and AP core 420, from among the various operations for processing image data that will be displayed through the display device 240. It is apparent that the graphic processing unit 425 may also access the common area 540, according to the control of the MP core 410 or the AP core 420, to perform a corresponding process. The process operations and objectives of the graphic processing unit 425 for processing the relevant image data are apparent to those skilled in the art, and thus will not be described here in further detail. However, if the process operations that require the controlling of the MP core 410 and the AP core 420 are different or cannot be integrated, the graphic processing unit 425 can be implemented separately for the respective functions.

The peripheral apparatus controller 430 provides control for peripheral apparatus that require control by the MP core 410 and AP core 420. However, if the process operations that require the controlling of the MP core 410 and the AP core 420 are different or cannot be integrated, the peripheral apparatus controller 430 can be implemented separately for the respective functions.

It is apparent that the graphic processing unit 425 and the peripheral apparatus controller 430 described above can be included in each of the MP core 410 and the AP core 420.

The first system bus 435 and second system bus 440 are system buses that can be used for signal transfers between components.

For example, one of the first system bus 435 and the second system bus 440 may be used exclusively for exchanging control commands, etc., (e.g. data processing instructions, etc.) between the MP core 410 and AP core 420. As described above, the command information for accessing the common area 540 may also be exchanged through the bus.

Also, if the MP core 410 and the AP core 420 each has to occupy a system bus to perform an operation, the first system bus 435 and the second system bus may each be occupied for use. To specify which component will occupy and use a system bus, information may be exchanged on the system bus occupation status of each component.

The first SM controller 445, according to the control of the MP core 410, sets a path by which the MP core 410 may access an MP exclusive area 520 (see FIG. 5) or the common area 540 to write/read data. The first SM controller 445 may also set a path, according to the control of the MP core 410, by which the graphic processing unit 425, peripheral apparatus controller 430, etc., may access the MP exclusive area 520 or the common area 540 to write/read data.

The second SM controller 450, according to the control of the AP core 420, sets a path by which the AP core 420 may access an AP exclusive area 530 (see FIG. 5) or the common area 540 to write/read data. The second SM controller 450 may also set a path, according to the control of the AP core 420, by which the graphic processing unit 425, peripheral apparatus controller 430, etc., may access the AP exclusive area 530 or the common area 540 to write/read data.

Although it is not illustrated in FIG. 4, it is apparent that a volatile memory may be coupled to each processor core for temporarily storing the data, etc., which the processor core is currently working with.

As described above, the integrated chip 400 according to an aspect of the present invention has multiple processor cores and provides coupling to the shared memory by multiple paths (i.e. the MP-SM bus, AP-SM bus, etc.), to allow each processor core to access the shared memory 230.

Figure 5:
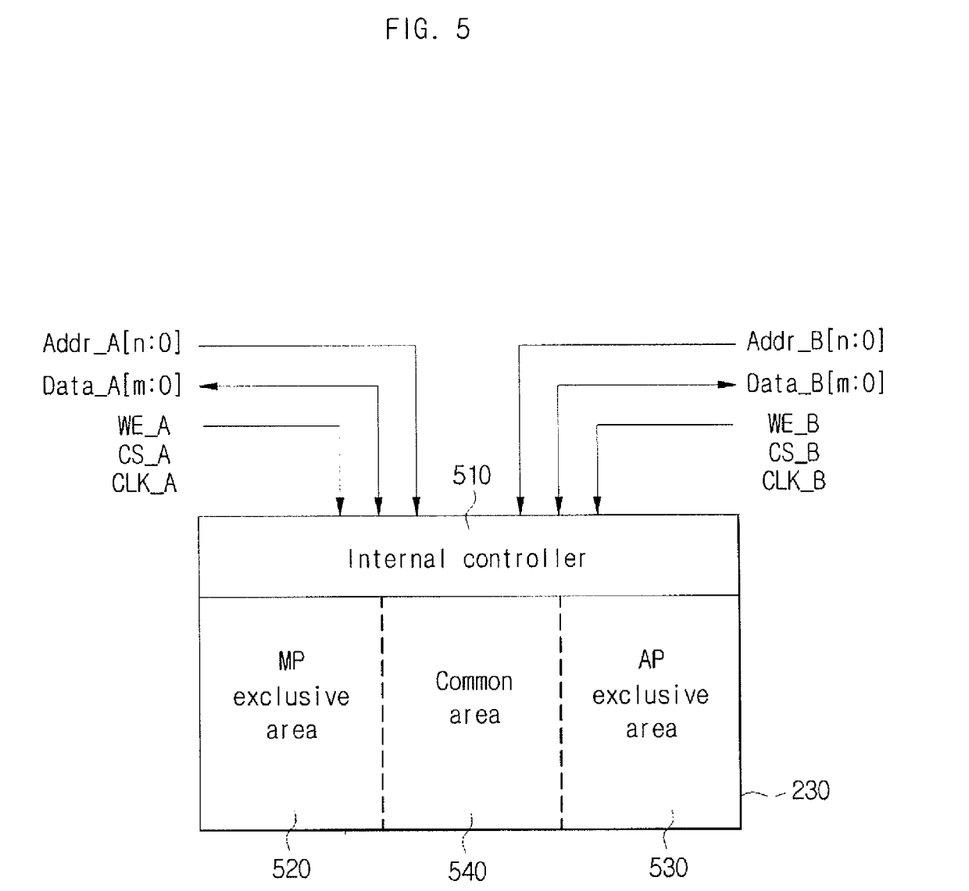
FIG. 5 is a drawing illustrating the composition of a memory unit according to an embodiment of the present invention.

FIG. 5 is a drawing illustrating the composition of a memory unit according to an embodiment of the present invention.

Referring to FIG. 5, a shared memory 230 according to an embodiment of the present invention is structured to be shared by two processor cores 410, 420, and therefore has to be equipped with at least two access ports. Of course, other components may also access the shared memory 230 under the control of each processor core, as already described above. The following descriptions will be presented under the assumption that the shared memory 230 has two access ports, where the respective access ports will be referred to as a first access port and a second access port.

The shared memory 230 includes an internal controller 510, and a storage area that may be allotted to multiple partition areas. The internal controller 510 allows each processor core 410, 420 to access each partition area through the first and second access port. The same clock or an independent clock can be used for each processor core 410, 420.

As in the example of FIG. 5, the storage area of the shared memory 230 can be partitioned into multiple areas, and the number of storage areas can be between a minimum of three and a maximum of j (a natural number). For example, the partitioned storage areas may include exclusive areas 520, 530, allotted individually to each of the equipped processor cores, and one or more common area 540.

Here, an exclusive area 520, 530 is an area which can be accessed exclusively by a processor core (or a component granted access by the processor core) preset to correspond to the exclusive area. (For example, the MP exclusive area 520 is a partition area accessible only by the MP core 410.) The common area 540 is an area which can be accessed, if not at the same time, individually by all of the processor cores that are coupled. (For example, if the MP core 410 is not accessing the common area 540, the AP core 420 may access the partition area.) This is to allow each of the processors to individually access a respective partition area (i.e. an exclusive area or the common area) by an independent path and perform a required operation (e.g. for writing data or reading data).

The common area 540 is a storage area that is limited to disallow multiple components from accessing at the same time, and the MP core 410 or the AP core 420 may, when requiring access to the common area 540, exchange the relevant information through the command transfer unit 415 or the first system bus 435, as described above.

Also, each processor core may input/output address signals (Addr[n:0]), data signals (data[m:0]), control signals (WE, CS, CLK, etc.), etc., to the shared memory 230. Here, WE is a write enable signal, CLK is a clock signal, and CS is a chip select signal. In FIG. 5, Addr_A, etc., may be a signal inputted from the MP core 410, and Addr_B, etc., may be a signal inputted from the AP core 420. Of course, the signal for accessing the shared memory 230 can be an MRS (mode register set) signal accordant with the JEDEC (Joint Electron Device Engineering Council) standard, instead of the address signal. That is, a particular bit or bits of the MRS signal can be used for requesting shared memory access status, and can be transferred together with the chip select signal, etc., to the internal controller 510. In this case, the MRS signal may be transmitted to the internal controller 510 through a bus for exchanging control signals, or may be transmitted to the internal controller 510 through a separate pin.

The procedures by which each processor core 410, 420 uses the shared memory will briefly be described below with reference to FIG. 5.

First, a description will be provided for the case where the MP core 410 has image data displayed on the display device 240.

In order to write the data that is desired to be displayed on the display device 240, the MP core 410 makes it so that request information for obtaining authorization to access the common area 540 is inputted to the AP core 420. The request information can be made to be inputted to the AP core 420 by way of the command transfer unit 415, or can be inputted by the MP core 410 to the AP core 420 through the first system bus 435.

Then, the MP core 410 makes it so that a command is inputted by way of the command transfer unit 415 to the AP core 420 for outputting the written image data to the display device 240. The command described above can include a designation of the location where the data to be processed is stored, and of the process type regarding how the relevant data is to be processed. The AP core 420, after receiving the command, accesses the common area 540 to read the written data, and provides an output to the display device 240.

However, in order for the AP core 420 to access the common area 540, the MP core 410 has to end the access to the common area 540 before the access of the AP core 420 to the common area 540.

Also, the AP core 420, after outputting to the display device 240 all of the required data from among the data written in the common area 540, notifies the MP core 410 through the command transfer unit 415 or the first system bus 435, to allow the MP core 410 to write image data for subsequent display in the common area 540.

Next, a description will be provided for the case where the MP core 410, after processing data of a large capacity, provides the data to the AP core 420 or the graphic processing unit 425. This is an example of using the common area 540 of the shared memory 230 for data transferring purposes.

The MP core 410, after reading the data written in the MP exclusive area 520 and performing the necessary processes, writes the data in the common area 540. When the writing of the data in the common area 540 is completed, a process command (e.g. a command to read and process the data written in the common area 540 and afterwards store the data in the AP exclusive area 530) is transmitted through the command transfer unit 415 or a system bus to the AP core 420 or the graphic processing unit 425.

The AP core 420 or the graphic processing unit 425, after accessing the common area 540 and reading and processing the written data, makes it so that the processed data is written, by way of the second SM controller 450, in the AP exclusive area 530. Since the AP exclusive area 530 is a storage area allotted to allow exclusive access to only the AP core 420, the graphic processing unit 425 can be limited to access the AP exclusive area 530 under the control of the AP core 420.

The method of using the shared memory as described above can also be implemented as a code readable by a computer in a recorded medium that can be read by a computer. The recorded medium readable by a computer includes all kinds of recorded media in which data readable by a computer system is stored. Examples of the recorded medium readable by a computer include ROM, RAM, CD-ROM, magnetic tape, floppy discs, optical data storing devices, etc., as well as those implemented in the form of carrier waves (e.g. transmissions over the Internet). Also, the recorded medium readable by a computer can be distributed over a computer system connected by a network, with code readable by a computer stored and executed in a distributed manner. Furthermore, a function program, code, and code segments for implementing the method of providing access status information by the shared memory may readily be deduced by programmers in the technical field to which the invention pertains.

As described above, an aspect of the present invention minimizes the number of chips installed, to efficiently utilize PCB space and enable a compact size for a portable terminal.

An aspect of the present invention can, in terms of installing, maintaining, and managing software, resolve the inconvenience of having to port programs separately to each of the independent processor chips, and the problem that the software structure becomes complicated.

An aspect of the present invention can simplify the communication and control between processor cores.

An aspect of the present invention can streamline the control flow for the multiple processor cores sharing the shared memory.

An aspect of the present invention can enhance the efficiency of memory use by partitioning the storage area of a shared memory into multiple partition areas (e.g. exclusive areas and a common area).

An aspect of the present invention can minimize data transmission times between each of the processor cores, by having the common area, from among the partitioned storage areas, be accessible to each processor.

An aspect of the present invention can optimize the operating speed and efficiency of each processor core, as it is possible to transfer data using the common area of the shared memory, so that supplementary processes for data transfer can be omitted in each processor core.

While the present invention has been described with reference to preferred embodiments, it will be understood that various changes and modifications may be made by those skilled in the art without departing from the spirit and scope of the present invention, as defined by the claims appended below.

What is claimed is:

1. A processor chip coupled to a shared memory, the processor chip comprising:
an MP core (main processor core);
an AP core (application processor core) configured to perform a processing function designated by a control of the MP core;
a first SM controller configured to set a path such that the MP core is coupled with the shared memory;
a second SM controller configured to set a path such that the AP core is coupled with the shared memory; and
a command transfer unit configured to transfer command information or authorization information from one of the MP core and the AP core to the other,
wherein the command transfer unit comprises a storage area for storing an identification code corresponding to the command information or the authorization information,
wherein the identification code identifies which of the MP core and the AP core to output request information for accessing the shared memory,
wherein the command transfer unit transfers the request information from one of the MP core and the AP core to the other when a request by one of the MP core and the AP core desiring access to a common area of the shared memory is written in the storage area of the command transfer unit,
wherein upon receipt of the request, the other of the MP core and the AP core completes access to the common area, and transfers the access to the common area back to the one of the MP core and the AP core desiring the access to the common area using the storage area of the command transfer unit, and
wherein the one of the MP core and the AP core desiring the access to the common area recognizes end of the access to the common area by the other of the MP core and the AP core by a pre-designated code value written in the storage area of the command transfer unit.

2. The processor chip of claim 1, wherein the MP core is coupled with the shared memory by way of an MP-SM (shared memory) bus, and
the AP core is coupled with the shared memory by way of an AP-SM bus.

3. The processor chip of claim 1, further comprising:
a host interface part for accessing one or more application processor chip,
wherein the MP core is configured to control an operation of an application processor chip coupled by way of the host interface part.

4. The processor chip of claim 1, wherein the shared memory has two or more access ports for coupling with the AP core and the MP core respectively.

5. The processor chip of claim 1, further comprising:
a graphic processing unit configured to process and output image data to be displayed through a display device; and
a peripheral apparatus controller configured to control an operation of a peripheral apparatus coupled to the processor chip according to a control of one or more of the MP core and the AP core.

6. The processor chip of claim 1, further comprising the shared memory to be implemented as one chip.

7. The processor chip of claim 1, wherein the pre-designated code value corresponds to disconnection information or completion information.

8. The processor chip of claim 1, wherein the MP core, in order to have data written in a common storage area of the shared memory processed by the AP core, is configured to control the command transfer unit such that a command is inputted to the AP core, the command comprising a process type indication and a written location of the data to be processed.

9. The processor chip of claim 8, wherein the MP core is configured to provide control such that designation information on a written location of data processed by the AP core is further included in the command.

10. The processor chip of claim 1, further comprising:
two or more system buses, wherein each of the MP core and the AP core is accessed by a corresponding SM controller through a respective system bus.

11. The processor chip of claim 10, wherein the MP core is configured to transmit the command information or the authorization information to the AP core using any one of the system buses.

12. The processor chip of claim 11, wherein the MP core, in order to have written data processed by the AP core after the MP core writes the data in the shared memory, is configured to input a command through the system bus to the AP core, the command comprising a process type indication and a written location of the data to be processed.

13. The processor chip according to claim 1, wherein the storage area of the shared memory is partitioned into exclusive storage areas and a common storage area, the exclusive storage areas allotted exclusively to the MP core and the AP core respectively, and the common storage area shared by the MP core and AP core, and
the authorization information is information exchanged between the MP core and AP core for obtaining authorization to access the common storage area.

14. The processor chip of claim 13, wherein the MP core or the AP core inputs an access request to the shared memory for accessing the common storage area, the access request comprising one or more of address information and a control signal.

15. The processor chip of claim 14, wherein the control signal comprises an MRS (mode register set) signal and a chip select signal for the shared memory.

16. The processor chip of claim 14, wherein the control signal comprises an address signal indicating the common area and a chip select signal for the shared memory.

17. The processor chip of claim 16, wherein the address signal comprises a bank address indicating a certain area of the common area.

18. A processor chip coupled to a shared memory, the processor chip comprising:
a first and a second system bus;
an AP core (application processor core) configured to perform an operation implementing a predetermined data processing function;
an MP core (main processor core) configured to perform an operation implementing a predetermined processing function and to perform a function for controlling an operation of the AP core; and
a command transfer unit comprising a storage area configured to receive an identification code written therein from one of the MP core and the AP core,
wherein the AP core is configured to process data written in the shared memory according to a control of the MP core, the shared memory being coupled with each of the MP core and the AP core,
wherein the command transfer unit inputs one of command information or authorization information corresponding to the identification code written in the storage area, from among command information or authorization information pre-stored for each identification code, to the other of the MP core and the AP core,
wherein the identification code is stored in the storage area,
wherein the identification code identifies which of the MP core and the AP core to output request information for accessing the shared memory,
wherein the command transfer unit transfers the request information from one of the MP core and the AP core to the other when a request by one of the MP core and the AP core desiring access to a common area of the shared memory is written in the storage area of the command transfer
wherein upon receipt of the request, the other of the MP core and the AP core completes access to the common area, and transfers the access to the common area back to the one of the MP core and the AP core desiring the access to the common area using the storage area of the command transfer unit, and
wherein the one of the MP core and the AP core desiring the access to the common area recognizes end of the access to the common area by the other of the MP core and the AP core by a pre-designated code value written in the storage area of the command transfer unit.

19. The processor chip of claim 18, wherein one of the first system bus and the second system bus is used exclusively for communication between the MP core and the AP core.

20. The processor chip of claim 18, wherein the shared memory has two or more access ports for coupling with the AP core and the MP core respectively.

21. The processor chip of claim 20, further comprising:
a first SM controller configured to set a path such that the MP core is capable of accessing the shared memory and writing/reading data; and
a second SM controller configured to set a path such that the AP core is capable of accessing the shared memory and writing/reading data,
wherein the MP core is coupled with the shared memory by way of the first SM controller, an MP-SM bus, and a first access port, and the AP core is coupled with the shared memory by way of the second SM controller, an AP-SM bus, and a second access port.

22. A digital processing device comprising:
a processor chip; and
a shared memory having two or more access ports,
wherein the processor chip comprises:
an MP core (main processor core);
an AP core (application processor core) configured to perform a processing function designated by a control of the MP core;
a first SM controller configured to set a path such that the MP core is coupled with a shared memory by way of an MP-SM (shared memory) bus;
a second SM controller configured to set a path such that the AP core is coupled with the shared memory by way of an AP-SM bus; and
a command transfer unit configured to transfer command information or authorization information from one of the MP core and the AP core to the other,
wherein the command transfer unit comprises a storage area for storing an identification code corresponding to the command information or the authorization information,
wherein the identification code identifies which of the MP core and the AP core to output request information for accessing the shared memory,
wherein the command transfer unit transfers the request information from one of the MP core and the AP core to the other when a request by one of the MP core and the AP core desiring access to a common area of the shared memory is written in the storage area of the command transfer unit,
wherein upon receipt of the request, the other of the MP core and the AP core completes access to the common area, and transfers the access to the common area back to the one of the MP core and the AP core desiring the access to the common area using the storage area of the command transfer unit, and wherein the one of the MP core and the AP core desiring the access to the common area recognizes end of the access to the common area by the other of the MP core and the AP core by a pre-designated code value written in the storage area of the command transfer unit.

23. A data processing method in a processor chip, the method comprising:

writing, by an MP core, of data in a common storage area of a shared memory and then transferring a process command to an AP core, wherein the transferring of the process command comprises writing, by the MP core, of an identification code in a storage area of a command transfer unit for reading and processing the data; and accessing, by the AP core, of the common storage area and reading the written data and then processing the written data in correspondence to the process command, wherein the processor chip comprises the MP core and the AP core, wherein each of the MP core and the AP core is coupled with the shared memory by way of an independent bus, wherein the identification code corresponds to command information or authorization information, wherein the identification code identifies which of the MP core and the AP core to output request information for accessing the shared memory, wherein the request information is transferred by the command transfer unit from one of the MP core and the AP core to the other when a request by one of the MP core and the AP core desiring access to a common area of the shared memory is written in the storage area of the command transfer unit, wherein upon receipt of the request, the other of the MP core and the AP core completes access to the common area, and transfers the access to the common area back to the one of the MP core and the AP core desiring the access to the common area using the storage area of the command transfer unit, and wherein the one of the MP core and the AP core desiring the access to the common area recognizes end of the access to the common area by the other of the MP core and the AP core by a pre-designated code value written in the storage area of the command transfer unit.

24. The method of claim 23, wherein the transferring of the process command further comprises:

inputting, by the command transfer unit, of a process command corresponding to the written identification code from among pre-designated process commands to the AP core.

* * * * *